United States Patent [19]

Mason et al.

[11] Patent Number: 4,745,143

[45] Date of Patent: May 17, 1988

[54] SALT RESISTANT POLYAMIDE COMPOSITION

[75] Inventors: Charles D. Mason, Chatham; Paul G. Galanty, West Orange; Elmer D. Jones, Madison, all of N.J.

[73] Assignee: Allied-Signal Inc., Morris Township, Morris Co., N.J.

[21] Appl. No.: 754,505

[22] Filed: Jul. 12, 1985

[51] Int. Cl.$^4$ .............................. C08K 5/43; C08K 5/41
[52] U.S. Cl. ........................................ 524/98; 524/169; 524/514; 528/488
[58] Field of Search ........................ 524/98, 169, 514; 525/163, 428; 528/488

[56] References Cited

U.S. PATENT DOCUMENTS

| | | | |
|---|---|---|---|
| 3,516,961 | 6/1970 | Robb | 524/98 |
| 3,676,400 | 7/1972 | Kohan et al. | 524/514 |
| 3,993,611 | 11/1976 | Sims et al. | 260/18 |
| 4,174,358 | 11/1979 | Epstein | 525/183 |
| 4,251,424 | 2/1981 | Pagilagan | 524/169 |
| 4,399,246 | 8/1983 | Hyde | 524/169 |

FOREIGN PATENT DOCUMENTS

| | | | |
|---|---|---|---|
| 48-9472 | 3/1973 | Japan | 524/169 |
| 57-212252 | 12/1982 | Japan . | |

OTHER PUBLICATIONS

Introducing Zytel ® Extrusion Resins, Nylon Engineering Thermoplastics; The Flexible Family; DuPont Bulletin.

*Primary Examiner*—Lewis T. Jacobs
*Attorney, Agent, or Firm*—Richard A. Negin

[57] ABSTRACT

A salt resistant composition comprising a polyamide selected from the group consisting of: polyepsiloncaprolactam, polyhexamethylene adipamide; copolymers of caprolactam, hexamethylene diamine, and adipic acid; and mixtures thereof. The composition contains from 2 to 30 percent, and preferably 4 to 30 percent based on the weight of the polyamide of a water insoluble plasticizer, and a copolymer of an alpha-olefin and an unsaturated carboxylic acid and derivatives thereof. The plasticizer has been found to enable the polyamide composition to maintain its flexibility upon exposure to a variety of salts. Preferred plasticizers include lauryl lactam and sulfonamides. Preferred are sulfonamide type plasticizers such as n-ethyl o,p-toluenesulfonamide; o,p-toluene sulfonamide, and toluene sulfonamide formaldehyde resin. The invention includes articles made from the composition.

6 Claims, No Drawings

SALT RESISTANT POLYAMIDE COMPOSITION

BACKGROUND OF THE INVENTION

This invention relates to a polyamide composition; and more particularly, to a polyamide composition which is resistant to salt.

Polyamide resins, such as known under the generic name nylon, are noted for a number of their properties such as hardness, high tensile strength, toughness, and rigidity. Polyamides are considered to be able to retain many of their physical properties at relatively high temperatures. For this reason, polyamides are formed into useful articles which can be used in varying environments. They are useful in automotive and other transportation applications.

Polyamides become brittle upon being exposed to a variety of salts commonly found, including calcium chloride, zinc chloride, magnesium chloride and the like. The need for salt resistant polyamide compositions is illustrated by U.S. Pat. No. 3,993,611. This patent discloses the use of a particular copolymer to enhance salt resistance.

SUMMARY OF THE INVENTION

The present invention is a composition comprising a polyamide which can include: polyepsiloncaprolactam; polyhexamethylene adipamide; copolymers of caprolactam, hexamethylene diamine, and adipic acid; and mixtures thereof. The composition contains from 2 to 30 percent, and preferably 4 to 30 percent based on the weight of the polyamide of a water insoluble plasticizer. The plasticizer has been found to enable the polyamide composition to maintain its flexibility upon exposure to a variety of salts. Sulfonamides based on plasticizers are preferred, and lauryl lactam has been found to be useful. Preferred sulfonamide type plasticizers include n-ethyl o,p-toluenesulfonamide; o,p-toluene sulfonamide, and toluene sulfonamide formaldehyde resin.

It is preferred to include other components in the composition which enhance or help to maintain the flexibility of the polyamide composition of the present invention. Included in such components are copolymers of alpha-olefins having from 1 to 8 carbon atoms and at least one unsaturated carboxylic acid having 3 to 8 carbon atoms or its derivative.

The present invention also comprises a method comprising the step of contacting the composition with a salt. The salt can be selected from the group including but not limited to of metal halides. The salt can be in the form of a water solution or in some other suitable liquid vehicle. Salt can permeate into the composition with liquid solution and be deposited after the liquid evaporates. It is believed that the deposited salts adversely affects the impact properties of the composition.

The present invention also includes articles having the claimed composition, including tubing and wire jacketing. Maintenance of flexibility of the composition of tubing and wires jacketing are particularly critical since these materials are often flexed during use.

DESCRIPTION OF THE PREFERRED EMBODIMENTS

The present invention includes a composition which comprises a polyamide, preferably a polyamide copolymer, a water insoluble plasticizer; and optionally other flexibilizing materials. These materials are intimately mixed together by a method such as melt blending. The composition of the present invention has been found to be extrudable and retain its flexibility upon being exposed to various salts.

The term "polyamide" used in the present invention is intended to include long chain synthetic polymers which have regularly recurring amide groups as an integral part of the main polymer chain, and hence, includes amide-ester copolymers. Suitable polyamides can be prepared by the polymerization of a difunctional monomer or equivalency, its cyclized lactam (e.g., epsilonaminocaproic acid or caprolactam, respectively) or by the reaction of a conjugate pair of monomers, for example, a diamide and a dicarboxylic acid (e.g. hexamethylenediamine and adipic acid), or a linear aminoaliphatic acid such as ω-amino undecanoic acid.

Suitable polylactam can be produced by the polymerization of lactam monomers of the formula

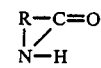

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryl lactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecanoic, etc. Also included are copolymers or blends of polyamides of the above two categories. Preferably, the polyamide contains 50 to 95% caprolactam. A preferred polyamide comprises a copolymer of caprolactam, hexamethylene diamine, and adipic acid. Preferably, there is from 80 to 95 percent by weight of caprolactam and 5 to 20 percent by weight of hexamethylene diamine and adipic acid.

Polyamides useful in the composition of the present invention preferably are polyepsiloncaprolactam, polyhexamethylene adipamide, their copolymers or mixtures thereof. Typically, the number average molecular weight of these polymers is between about 10,000 and about 50,000, preferably 15,000 to 40,000 and more preferably 20,000 to 30,000. This is because mechanical properties improve rapidly up to about 20,000 and processing starts becoming more difficult after 30,000.

Polyepsiloncaprolactam, polyhexamethyleneadipamide, and copolymers suitable for use herein can contain a variety of terminal functionality. Preferred terminal functionality is that containing:

(a) A carboxyl group attached to both ends of the polyamide chain;

(b) a carboxyl group attached to one end and an acetamide group attached to the other end of the polyamide chain;

(c) an amino group attached to both ends of the polyamide chain; and (d) a carboxyl group attached to one end and an amino group attached to the other end of the polyamide chain.

A preferred polyepsiloncaprolactam, polyhexamethylene adipamide, or copolymer has a carboxyl group attached to one end and an amine group attached to the other end of the polyamide chain. Monocarboxylic acids or dicarboxylic acids, including acetic, azelaic or sebacic acids, can be used to terminate the amide chain. Preferably more than 50 percent to about 90 percent, and more preferably 60 percent to 80 percent, of the chain ends have carboxyl termination in acid terminated polyamides.

The polyamides suitable for use herein can be produced by an conventional process known in the art. Illustrative of one such process which is suitable for producing polyepsiloncaprolactam involves two steps. The first step consists of heating epsilon-caprolactam and hexamethylene diamine and water to a temperature of about 180° C. to 300° C. under superatmospheric pressure to effect partial polymerization. The water is allowed to distill gradually from the reaction mixture while the polymerization continues after most of the monomer has been converted to a low molecular weight polymer. The pressure is reduced to atmospheric pressure wherein the second step is commenced which comprises completing the polymerization by heating at atmospheric pressure in the range of about 180° C. to 300° C.

Also suitable for use herein are polyamide interpolymers comprised of a polyamide and one or more comonomers. Non-limiting examples of such comonomers include acrylic or methacrylic acid and/or their derivatives, such as acrylonitrile, acrylamide, methyl, ethyl, propyl, butyl, 2-ethyl-hexyl, decyl and tridecyl esters of acrylic or methacrylic acid, vinyl esters such as vinyl acetate and vinyl propionate, vinyl aromatic compounds such as styrene, methyl styrene, and vinyl toluenes and vinyl esters such as vinyl isobutyl ether.

The composition of the present invention includes a water insoluble plasticizer. For the purposes of the present invention, solubility is the amount of plasticizer which dissolves in water at ambient conditions, i.e. 23° C. A "water insoluble" plasticizer, is a plasticizer which is not significantly soluble in water. The solubility of the plasticizer useful in the present invention in water should be less than about 5% by weight of the plasticizer dissolving in water, preferably less than 2%, more preferably less than 1%, most preferably less than 0.05%, and ideally 0%.

A plasticizer is considered a chemical compound used to facilitate compounding and improve flexibility and other properties of the finished product. It is preferably physically and chemically stable and inert, and which possesses some affinity for polyamide. Plasticizers do not usually chemically react with the resin, but form permanent homogeneous physical mixtures. The final mixture or compound should retain the modified properties for the useful life of the resins application.

The plasticizer should be efficient and compatible with the polyamide. The plasticizer and polyamide should form a mutually homogeneous compound in which there is no tendency to phase separation between plasticizer and the polyamide. Plasticizers usually affect specific physical properties. In the present invention, the purpose of the plasticizer is to improve the flexibility of the polyamide and maintain the improved flexiblity even upon an exposure to salt.

The plasticizer is preferably efficient. For the purposes of the present invention, an efficient plasticizer is one which results in a reduction in flexural modulus as measured according to ASTM D-790, of at least $50 \times 10^3$ psi in a composition containing 90 percent polyamide and 10 percent plasticizer, compared to the flexural modulus in a composition containing of 100 percent polyamide. Preferred plasticizers of the present invention result in a reduction in flexural modulus of at least $100 \times 10^3$ psi according to this test at the ten percent level.

There is from 2 to 30 percent, preferably 4 to 30 percent, and more preferably 5 to 20 percent based on the weight of polyamide of at least one water insoluble plasticizer. The plasticizer can be an external acting plasticizer.

The preferred plasticizers for the present invention are sulfonamide based plasticizers having the formula:

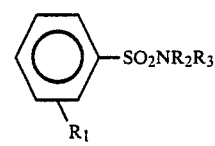

where $R_1$ is H or an alkyl group; $R_2$ is H or an alkyl group; and $R_3$ is an alkyl group. Preferred plasticizers of this formula include: $R_1$—methyl group, $R_2$—hydrogen radical, and $R_3$ ethyl group; $R_1$—methyl group, $R_2$—hydrogen radical, and $R_3$ hydrogen radical; and $R_1$ hydrogen radical, $R_2$—hydrogen radical, and $R_3$ is a butyl group. Preferred plasticizers include N-ethylene o-toluenesulfonamide, N-ethylene p-toluene sulfonamide or mixtures thereof, o-toluenesulfonamide, p-toluenesulfonamide or mixtures thereof, and toluenesulfonamide-formaldehyde resin. Lauryl lactam, although not as efficient a plasticizer as the sulfonamide type plasticizers is insoluble in water and can also be used.

It is well known in the art that upon being exposed to salt, particularly by aqueous salt solutions such as zinc chloride and calcium chloride, which are used in road salts polyamides tend to lose their flexibility and become brittle. Although the present invention is not intended to be limited by a proposed mechanism for loss of properties on exposure to salt, one theory is based on the salt solution permeating into the polyamide. If the polyamide has lubricants or low molecular weight fractions which are water soluble, these water soluble fractions leach out leaving voids in which the salt can be deposited. These salts cause the polyamide to become brittle and crack more easily.

Conventional plasticizers such as caprolactam monomer, have as their purpose to make polyamide more flexible. These plasticizers can be leached out leaving voids which can be filled with the dissolved salt in the water permeating into the polyamide matrix.

The composition of the present invention preferably contains other salt resistant flexibilizing materials including copolymers of alpha-olefins having 1 to 8 carbon atoms and at least one monomer selected from an unsaturated carboxylic acid having 3 to 8 carbon atoms and its derivatives including esters, salts, and anhydrides, and the like. Also included as acid containing copolymers are graft copolymers such as copolymers of ethylene and propylene modified with acids or anhydrides such as maleic acid, maleic anhydride or fumaric acid. There can be from 5 to about 100 percent copolymer and preferably from 10 to 80 percent of the copolymer based on the weight of the polyamide and insoluble plasticizer. The most preferred composition contains from 30 to 70 percent of the copolymer based in the weight of the polyamide and the insoluble plasticizer.

Carboxylic acid-containing copolymers are preferably ethylene/carboxylic acid copolymers. The carboxylic acid monomers include unsaturated monocarboxylic acids of 3 to 6 carbon atoms, unsaturated dicarboxylic acids of 4 to 8 carbon atoms, and mixtures thereof. Representative examples of such monomers include acrylic acid, methacrylic acid, crotonic acid, maleic acid, and fumaric acid. Preferred are acrylic acid and methacrylic acid, more preferred is acrylic acid.

Ester-containing copolymers are preferably ethylene/alkyl ester copolymers. These include $C_1$ to $C_4$ alkyl esters of the aforementioned carboxylic acid-containing monomers, preferably acrylic acid and methacrylic acid, or other substituted acrylic acids. Representative examples of such esters include methyl, ethyl, propyl, isopropyl, butyl, isobutyl and t-butyl esters of such acids. Preferred are methyl and ethyl acrylate and methyl and ethyl methacrylate; most preferred is ethyl acrylate.

Useful ionic copolymers can be random ionic copolymers of an alpha-olefin of the formula $RCH=CH_2$ where R is H or alkyl radicals having from 1 to 8 carbon atoms, and an alpha,beta-ethylenically unsaturated carboxylic acid having from 3 to 8 carbon atoms. The ionic copolymers has at least 10 percent of the carboxyl acid groups neutralized with metal ions. Random ionic copolymers which can be used in the composition of the present invention are described in U.S. Pat. No. 3,264,272, which is incorporated herein by reference.

The cations of metals which are suitable in forming the ionic copolymers which can be used in the present invention can include mono-, di- and trivalent ions of metals and Groups I, II, III, IV-A and VIII of the Periodic Table of Elements. Suitable monovalent cations include cations of sodium, potassium, lithium, cesium, silver, mercury, and copper. Suitable divalent cations include the cations of beryllium, magnesium, calcium, strontium, barium, copper, cadmium, mercury, tin, lead, iron, cobalt, nickel, and zinc. Suitable trivalent cations include the cations of aluminum, scandium, and iron. For the purposes of the composition of the present invention, the most preferred metal cation used to form the ionic copolymer is the cation of zinc.

The degree of neutralization of the ionic copolymer by the metal cations should be at least 10 percent of the carboxylic acid groups. It is generally desirable to neutralize at least 50 percent of the acid groups. The degree of neutralization may be measured by several techniques known in the art, such as infrared analysis or titration. These techniques are disclosed at pages 74–75 in "Ionic Copolymers" by L. Holliday, published by John Wiley and Sons, N.Y. and Toronto (1975).

The copolymers which can be used to form the ionic copolymers of the present invention include copolymers of ethylene and an alpha,beta-ethylenically unsaturated carboxylic acid. Alpha,beta-ethylenically unsaturated carboxylic acids which can be polymerized with the ethylene include acrylic acid, methacrylic acid, itaconic acid, and ethacrylic acid. Further, the copolymers can be copolymers of the type described and used in U.S. Pat. No. 4,174,358, which is incorporated herein by reference.

Preferred compositions of the present invention include at least one water insoluble plasticizer and at least one copolymer. Too much of the plasticizer results in excess plasticization which causes difficulty in processing. To much copolymer sacrifices many of the advantages of the properties of the polyamide. A balance is therefore preferred. The use of the copolymer alone does not sufficiently lower flexibility required in the composition of the present invention. The use of the plasticizer is required.

The compositions of the present invention may be modified by one or more conventional additives such as stabilizers and inhibitors of oxidative, thermal, and ultraviolet light degradation; lubricants, and mold release agents, and colorants including dyes and pigments. Additionally, additives not deleterious to physical properties such as fibrous and particulate fillers and reinforcements, and nucleating agents can be added to the compositions of the present invention.

The present invention is particularly useful where compositions can be extruded. An indication of extrudability is that the composition can be extruded directly to form articles suitable for use in the form extruded. Typical of such uses are extrusions for tubing, wire jacketing, monofilaments, and profiled extrusions.

One measure of the flexible properties of the composition of the present invention is the flexural modulus as measured in the Examples according to ASTM D-790. The flexural modulus of an extrudable composition of the present invention can be from about $50 \times 10^3$ to about $400 \times 10^3$ psi (pounds per square inch), preferably $50 \times 10^3$ to $250 \times 10^3$ psi, and most preferably from 75 to $10^3$ to $200 \times 10^3$ psi. A particularly useful composition has a flexural modulus of about $150 \times 10^3$ psi. Ultra flexible compositions have a flexural modulus of about $100 \times 10^3$ and lower.

The present invention includes a method of contacting the above-described composition with a salt. Typically, the composition is in the form of an article which contacts the salt. The composition can be exposed to the salt by immersion into a solution, usually an aqueous salt solution. Such a method would occur, for example, where the composition is immersed in sea water. Alternately, the composition can be exposed to road salt where the road salt dissolves into water which lays on the road and is transferred to the composition by being splashed or being in the form of a mist which deposits on the composition. Yet another means of contact is through the air. In atmospheres such as encountered near the sea shore, in industrial facilities, in mining facilities and the like, salt can contact and be deposited on the composition through the air. Of course, the composition can be used in direct contact with salt or salt solution. The process of the present invention is particularly useful when the composition is exposed to salt solutions.

The composition of the present invention has been found particularly useful to make articles which are exposed to salts during use. Such articles typically include automotive related articles which are exposed to solutions of road salt as well as molded articles which are used in nautical applications so as to be exposed to sea water. Particular articles include wire coating or jacketing used to coat or jacket wires which are exposed to the environment. Tubing made out of polyamide compositions which are exposed to the environment, particularly the tubing used in automobiles which is exposed to road salt, and rotationally molded articles which are exposed to environment.

Tubing the wire jacketing can be produced by processes known in the art. A preferred method is extrusion of polyamide tubes which can also include the coextrusion of polyamide tubes having inner layers of other polymers such as polyolefins. Similarly, wire jacketing and wire coating can be produced by known extrusion techniques. Rotationally molded articles can be formed of the composition of the present invention by means well known in the rotational molding art.

The compositions of the present invention are particularly useful for molding and can also be extruded to form film.

Several examples are set forth below to illustrate the nature of the invention and the manner of carrying it out. However, the invention should not be considered as being limited to the details thereof. All parts are precents by weight unless otherwise indicated.

The compositions in the following Examples were generally prepared by first dry blending the materials of each composition. Each dry blended composition was fed into the hopper of a 2½ inch National Rubber Machine (NRM) extruder having an L/D of 24. The extruder barrel temperatures were about: ZONE 1—260° C.; ZONE 2—260° C.; ZONE 3—260° C.; and ZONE 4—260° C. The flange was set at about 240° C. The various blends were extruded at about 80 to 85 rpm. The extrudate was rapidly passed through a water bath. The strands were passed through a pelletizing machine, and the pellets were collected. Test specimens were prepared on a molding machine set at a temperature from 238° C. to 249° C. The mold temperature was maintained at about 82° C. (180° F.). The molding cycle was 10 to 20 seconds forward ram, and 15 to 20 seconds on hold.

The tensile and elongation properties were tested according to ASTM D-638, and the flexural modulus was tested according to ASTM D-790. The values for flexural modulus shown on the Tables are for samples which were not aged or exposed to salt.

In order to measure the retention of flexibility, the samples were immersed in heated water solution of calcium chloride salt. Type I tensile bars used in accordance with the referenced ASTM test D-638 were placed under 4 percent flexural strain in a 50 percent by weight water solution of calcium chloride heated to 90° C. for seven days. The combination of stress, relatively high salt concentration and heat served to accelerate any failure reaction that might take place. The elongation at break was determined at 2.0 inches/min. testing speed and calculated per Section 11.2 of ASTM Standard Test Method D638-82a. The percent retained elongation values were calculated by dividing the average elongation at break value by the average elongation at break measured on sets of identical control specimens that were stressed and heated in water only (no dissolved salt) then multiplying by 100. This isolated the effect of salt on elongation from the effects of stress, temperature, moisture, and time.

COMPARATIVE EXAMPLES 1-6

Comparatives 1-6 illustrate the difficulties experienced by polyamide upon exposure to calcium chloride solution. The polyamides were homopolymers of caprolactam. The polyamides had the indicated formic acid viscosity (FAV). The compositions were heat stabilized using 0.0162% by weight of copper chloride and 0.25% by weight of potassium iodide where the weight percent is based on the polyamide. The compositions of Comps. 1 and 3-5 were black and contained 0.375 weight percent carbon black based on the total compound weight. The compositions of Comps. 1 and 4-6 contained Surlyn ® 1801 (S1801), a zinc salt of ethylene methacrylic acid sold by the DuPont Company, and ethylene ethyl acrylate copolymer (EEA) which is commercially available from Union Carbide under the trademark Bakelite Flexible Ethylene Copolymer DPD-6169. The EEA is described as having a melt index of 6 g/10 min. and an ethyl acrylate content of 18 weight percent (about 5.8 mol percent). The compositions and results are summarized in Table 1 below. Amounts are percent by weight.

TABLE 1

| Comp | 1 | 2 | 3 | 4 | 5 | 6 |
|---|---|---|---|---|---|---|
| Polyamide | >71.80 | >99.0 | 90.0 | 66.5 | 67.0 | 54.2 |
| (FAV) | (70) | (70) | (55) | (55) | (55) | (55) |
| EEA | 4.0 | — | — | 13.0 | 7.0 | 6.0 |
| S 1801 | 24.0 | — | — | 12.0 | 18.0 | 31 |
| MgO | 0.2 | — | — | — | — | — |
| Caprolactam | <1 | <1 | 10 | 8.5 | 8.0 | 8.8 |
| Time to crack (hrs.) | 168 | 48 | 1 | .25 | .25 | .25 |
| Elong @ Brk (%) | 235 | 41 | 290 | 330 | 339 | 390 |
| Retained Elong (%) | 84 | — | — | — | — | — |

Comparatives 2-6 resulted in cracking prior to tensile testing. Comparative 1, had no visible cracks in any of three specimens which were tested after being removed from the hot calcium chloride solution after seven days, and cooled to room temperature. As indicated from the Comparatives in each case where water soluble caprolactam was present as a plasticizer, the sample actually cracked within one hour. Comp. 1 containing 28 percent of ethylene copolymers had much more crack resistance than any of the other Comparatives. It retained 84 percent of elongation compared to the control. Therefore, using the ethylene copolymers results in an advantage over using the polyamide alone. Using a water soluble plasticizer results in a severe deterioration in resistance to salt solutions. As indicated by the Examples below, a polyamide composition using the carboxylic acid (and derivative) copolymers above does not result in as low a flexibility in combination with salt resistance, as can be obtained when using an insoluble plasticizer.

EXAMPLES 1-7

The compositions in Examples 1-7 and Comparatives 7-10 were produced by dry blending the ingredients for 20 minutes. The compositions were then extruded under the same conditions as Comparatives 1-6. The compositions were extruded into strands which were pelletized.

The plasticizers (Plas) used were lauryl lactam (LL), a mixture of N-ethyl-o-tolunesulfonamide and N-ethyl-p-toluenesulfonamide sold by Monsanto as Santicizer 8 (S-8). Also used was Santicizer 9 sold by Monsanto which is a mixture of o-toluenesulfonamide and p-toluenesulfonamide. The lauryl lactam is a solid sold by Rilsan Corporation.

Examples 1-6 and Comp. 7-9 used a polycaprolactam (N$_6$) homopolymer having an FAV of 70. Example 7 and Comp. 10 used a copolymer (N$_6$/N$_{66}$) of 85 weight percent polyepsiloncaprolactam and 15 weight percent of an equimolar mixture of hexamethylene diamine and adipic acid. It has an FAV of 65.

Table 2 below summarizes the compositions used in weight percent, and their tensile results. The sum of the S1801 and the EEA is shown as total ethylene copolymer additive (Eth. Cop.). The flexural modulus, the elongation to break, and retained elongation were measured in accordance with the procedure described above.

TABLE 2

| | Nylon | Plas | EEA | S 1801 | Eth. Cop. | Flex. Mod. (psi × 10⁻³) | Elong Brk (%) | Ret. Elong (%) |
|---|---|---|---|---|---|---|---|---|
| Ex. | | | | | | | | |
| 1 | 61 | 4 (LL) | 5.9 | 29.1 | 35 | 184 | 343 | 77 |
| 2 | 56 | 4 (S-9) | 5.7 | 34.3 | 40 | 170 | 180 | 53 |
| 3 | 54 | 6 (S-9) | 5.7 | 34.3 | 40 | 100 | 324 | 103 |
| 4 | 54 | 6 (LL) | 5.7 | 34.3 | 40 | 174 | 377 | 98 |
| 5 | 52 | 8 (S-9) | 5.7 | 34.3 | 40 | 75 | 358 | 97 |
| 6 | 52 | 8 (S-9) | 5.7 | 34.3 | 40 | 135 | 317 | 78 |
| 7 | 61* | 4 (S-8) | 5.9 | 29.1 | 35 | 115 | 287 | 84 |
| Comp. | | | | | | | | |
| 7 | 64 | — | 5.1 | 29.9 | 36 | 210 | 304 | 75 |
| 8 | 60 | — | 5.9 | 34.1 | 40 | 214 | 403 | 89 |
| 9 | 55 | — | 6.3 | 38.7 | 45 | 183 | 377 | 106 |
| 10 | 60* | — | 5.9 | 34.1 | 40 | 162 | 292 | 88 |

*$N_6/N_{66}$

A review a Table 2 shows an improvement in flexibility while maintaining resistance to cracking upon exposure of the composition of the present invention to calcium chloride.

Examples 1-6 and Comparative 8 were compositions containing 40% by weight of the ethylene based copolymer. These Examples show that the composition of the present invention achieves a greater flexibility than the Comparative 8. Comparative 8 retains elongation upon exposure to calcium chloride consistant with Comparative 1. However, Examples 1 through 6 have greater flexibility as well as satisfactory retained elongation. All of the Example compositions above can be extruded.

While exemplary embodiments of the invention have been described, the true scope of the invention is to be determined by the following claims.

What is claimed is:

1. A method comprising the step of contacting a composition comprising a calcium chloride salt with a composition: consisting essentially of
    a polyamide comprising from 50 to 100% by weight of caprolactam groups; and
    from 2 to 30 percent based on the weight of the polyamide of a water insoluble plasticizer.

2. The method of claim 1 wherein the polyamide is selected from the group consisting of:
    polyepsiloncaprolactam; a copolymer of caprolactam, hexamethylene diamine and adipic acid, and mixture thereof.

3. The method of claim 1 wherein the polyamide is a copolymer containing from 80 to 95 by weight percent caprolactam, and equimolar amounts of hexamethylene adipamide and adipic acid.

4. The method of claim 1 wherein the polyamide contains from 50 to 95 percent caprolactam.

5. The method as recited in claim 1 wherein the composition further comprises a copolymer of at least one alpha-olefin having 1 to 8 carbon atoms and a monomer selected from an unsaturated carboxylic acid having 3 to 8 carbon atoms and the derivatives of said acid.

6. A method comprising the step of contacting a composition comprising a calcium chloride salt with a composition consisting essentially of:
    a polyamide comprising from 50 to 100% by weight of caprolactam groups;
    from 2 to 30 percent based on the weight of the polyamide of a plasticizer selected from the group consisting of: lauryl lactam, toluenesulfonamide formaldehyde resin, and

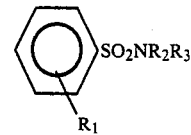

wherein
$R_1$ is H or an alkyl group;
$R_2$ is H or an alkyl group;
$R_3$ is H or an alkyl group; and
from 5 to 100 percent on the weight of the polyamide of at least one copolymer of an alpha-olefin having 1 to 8 carbons atoms and a monomer selected from an unsaturated carboxylic acid having 3 to 8 carbon atoms and derivatives of said acid.

* * * * *